US007334395B2

(12) United States Patent
Tweedie et al.

(10) Patent No.: US 7,334,395 B2
(45) Date of Patent: Feb. 26, 2008

(54) AIRCRAFT STRUCTURE THAT INCLUDES A DUCT FOR GUIDING FLUID FLOW THERETHROUGH

(75) Inventors: Thomas James Tweedie, Antrim (GB); John Stanley Richardson, Belfast (GB)

(73) Assignee: Short Brothers plc, Northern Ireland (GB)

( * ) Notice: Subject to any disclaimer, the term of this patent is extended or adjusted under 35 U.S.C. 154(b) by 601 days.

(21) Appl. No.: 10/937,940

(22) Filed: Sep. 10, 2004

(65) Prior Publication Data

US 2005/0229584 A1 Oct. 20, 2005

(30) Foreign Application Priority Data

Sep. 10, 2003 (GB) ................................ 0321139.8

(51) Int. Cl.
*F02K 1/54* (2006.01)

(52) U.S. Cl. .................... 60/226.2; 60/230; 244/110 B

(58) Field of Classification Search ............... 60/226.2, 60/230; 239/265.31; 244/110 B
See application file for complete search history.

(56) References Cited

U.S. PATENT DOCUMENTS

| | | | | |
|---|---|---|---|---|
| 2,637,164 | A | 5/1953 | Robson et al. | |
| 4,047,381 | A * | 9/1977 | Smith | 60/226.2 |
| 4,232,516 | A | 11/1980 | Lewis et al. | 60/226 |
| 6,568,172 | B2 * | 5/2003 | Jannetta et al. | 60/226.2 |
| 6,968,675 | B2 * | 11/2005 | Ramlaoui et al. | 60/226.2 |
| 2003/0056493 | A1 | 3/2003 | Jannetta et al. | 60/226.2 |

FOREIGN PATENT DOCUMENTS

| | | | |
|---|---|---|---|
| EP | 1416147 | 10/2003 | |
| FR | 2815672 | 10/2001 | |
| GB | 925010 A | 2/1961 | 4/110 |
| GB | 1 386 232 | 3/1975 | |
| GB | 1 230 125 | 4/1991 | |
| GB | 2314818 | 1/1998 | |
| GB | 2368566 | 5/2002 | |

OTHER PUBLICATIONS

European Search Report dated Feb. 2, 2007 for corresponding EP application No. 04021331.6-1267.
Search Report dated Feb. 9, 2004 for corresponding GB application no. GB 0321139.8.

* cited by examiner

*Primary Examiner*—L. J. Casaregola
(74) *Attorney, Agent, or Firm*—Myers Bigel Sibley & Sajovec, P.A.

(57) ABSTRACT

An aircraft structure includes a duct having an inlet for fluid flow into the duct and a first outlet for fluid flow out of the duct. The duct is configured to guide fluid flow out of the duct through the first outlet in an at least partially reversed direction relative to fluid flow into the duct to thereby reverse thrust.

21 Claims, 8 Drawing Sheets

AIRCRAFT STRUCTURE THAT INCLUDES A DUCT FOR GUIDING FLUID FLOW THERETHROUGH

RELATED APPLICATION

This application claims priority to and the benefit of Great Britain Patent Application No. 0321139.8, filed Sep. 10, 2003, the disclosure of which is hereby incorporated herein by reference.

BACKGROUND OF THE INVENTION

This invention relates to a thrust reverser, in particular, but not exclusively, it relates to a natural blockage thrust reverser and all other types of thrust reversers in general.

It is known to use a natural blockage thrust reverser in an aircraft engine to achieve reverse thrust. Such a known thrust reverser 1 is illustrated in FIGS. 1 to 3.

As illustrated in FIGS. 1 and 2, the thrust reverser 1 comprises a fan duct 2 through which air flows. A translating cowl 3 is provided, the translating cowl 3 being movable relative to a stationary portion 4 of the aircraft engine nacelle. A series of cascaded vanes 5 (FIG. 3) is mounted on the downstream side of the stationary portion 4 to turn the flow the required amount to achieve reverse thrust.

In use, the translating cowl 3 may be moved relative to the stationary portion 4 from the stowed configuration (FIG. 1) to the deployed configuration (FIG. 2). In this manner, the aft portion 8 of the fan duct 2 is blocked off and the flow is diverted through the cascaded vanes 5 to achieve reverse thrust.

Although the cascaded vanes 5 are an efficient means of turning the flow, there are however a number of disadvantages associated with their use. In particular, cascaded vanes are costly to manufacture, and also add weight to the powerplant, and further can be subject to foreign object damage and require maintenance.

There is therefore a need for a thrust reverser which overcomes at least some of the disadvantages associated with the known natural blockage thrust reverser.

SUMMARY OF THE INVENTION

According to the invention, there is provided an aircraft structure comprising a duct having an inlet for fluid flow into the duct and a first outlet for fluid flow out of the duct, the duct being configured to guide fluid flow out of the duct through the first outlet in an at least partially reversed direction relative to fluid flow into the duct to reverse thrust.

In one embodiment of the invention the device comprises a closure member for selectively preventing fluid flow out of the duct through the first outlet. Preferably the closure member has an at least partially concave surface to guide fluid flow. Ideally, at least part of a wall of the duct has a convex surface to guide fluid flow. Most preferably the closure member is mateable with a co-operating part of a wall of the duct.

In one case the closure member is movable relative to the duct between a deployed configuration for fluid flow out of the duct through the first outlet and a stowed configuration for preventing fluid flow out of the duct through the first outlet. The device preferably comprises a second outlet for fluid flow out of the duct through the second outlet when the closure member is in the stowed configuration. Ideally the closure member at least partially restricts fluid flow out of the duct through the second outlet when the closure member is in the deployed configuration. The second outlet may be located substantially downstream of the first outlet.

The duct is preferably configured for fluid flow out of the duct through the second outlet in at least partially the direction of fluid flow into the duct. Ideally the closure member comprises a translating cowl.

In another embodiment the direction of fluid flow out of the duct through the first outlet subtends an angle of greater than 90° with the direction of fluid flow into the duct. Ideally the direction of fluid flow out of the duct through the first outlet subtends an angle of approximately 135° with the direction of fluid flow into the duct.

The structure comprises in one case a natural blockage thrust reverser.

In a preferred embodiment the structure comprises means to control fluid flow through the duct to minimise flow separation. Ideally the flow control means comprises a slot adjacent a sidewall of the duct for fluid flow through the slot to minimise flow separation. Most preferably the duct side-wall is provided by a surface of a diverter fairing. The flow cross-sectional area of the slot may be small relative to the overall flow cross-sectional area of the duct. Preferably the slot is formed between a slat and a sidewall of the duct. Ideally, the flow control means is located in the region of a convex portion of a sidewall of the duct. Most preferably the flow control means is located in the region of a downstream end of a diverter fairing. The flow control means may be located in the region of the first outlet.

In a further embodiment of the invention the device comprises means to direct fluid flow as fluid flows out of the duct through the outlet. Preferably the flow directing means is mounted to the closure member. Ideally the flow directing means is mounted to a wall of the duct. The flow directing means may comprise one or more flow skewing devices.

In one case the duct comprises an aircraft engine fan duct.

In another case the aircraft structure comprises an aircraft engine nacelle.

In the aircraft structure according to the invention, the duct is configured to guide the fluid flow out of the duct in a reversed direction and in this way reverse thrust will be achieved. In particular the fluid flow is turned by means of the duct geometry to achieve the thrust reversal. This thrust reversal is achieved without cascaded vanes being required to turn the flow. Therefore the aircraft structure according to the invention does not suffer from the disadvantages associated with cascaded vanes. In particular manufacturing costs and/or weight and/or maintenance requirements are minimised.

The thrust reverser according to the invention does not require cascaded vanes to reverse the flow.

The flow control means enables an improved reverse turning angle of the reverse flow, and an improved mass flow rate of the reverse flow to be achieved. In this manner, it is possible to achieve a reverse thrust performance which is comparable with that of a cascaded vane thrust reverser.

Problems associated with flow separation such as flow oscillation and vibration are effectively reduced by means of the aircraft structure according to the invention.

BRIEF DESCRIPTION OF THE DRAWINGS

The invention will be more clearly understood from the following description of some embodiments thereof, given by way of example only, with reference to the accompanying drawings, in which.

DETAILED DESCRIPTION OF EMBODIMENTS

Figure 1:
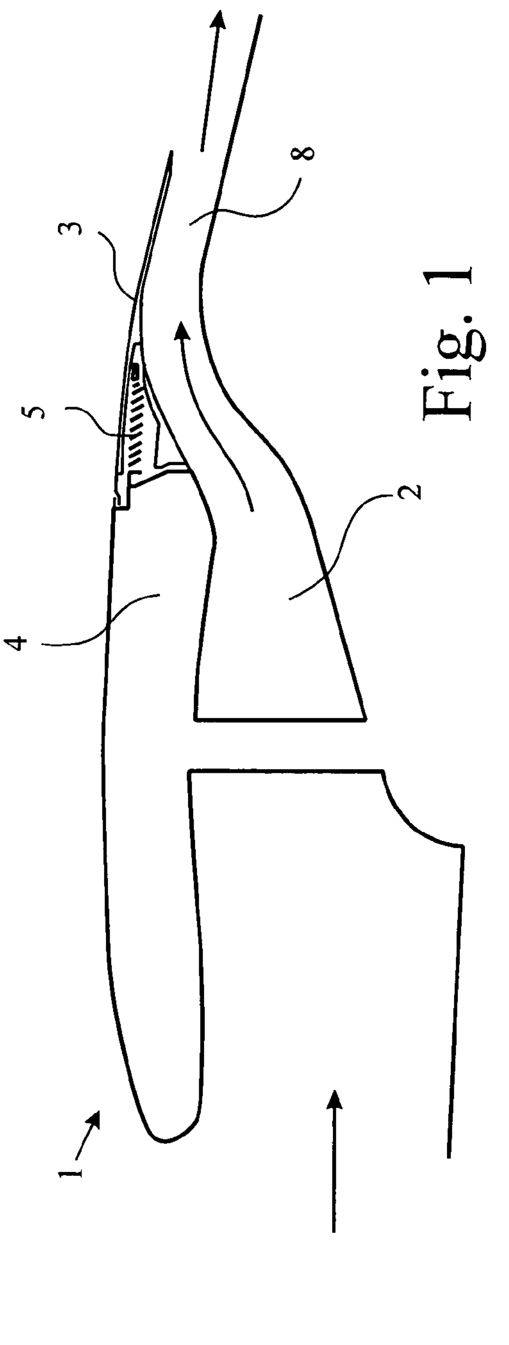
FIG. 1 is a schematic side view of a known natural blockage thrust reverser in a stowed configuration.
Figure 2:
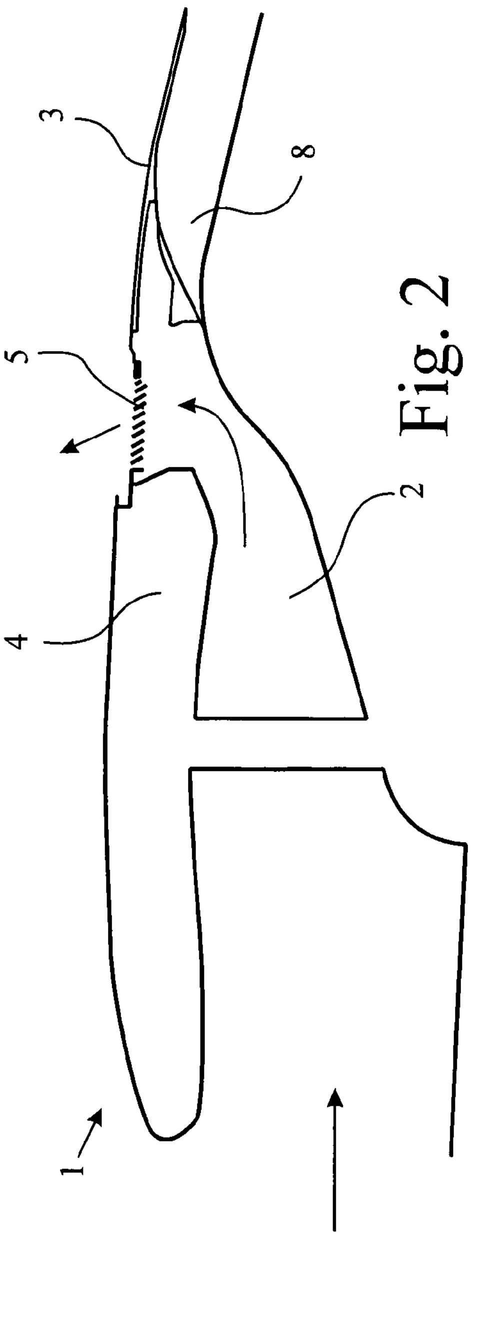
FIG. 2 is a schematic side view of the natural blockage thrust reverser of FIG. 1 in a deployed configuration.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. As used herein, the term "and/or" includes any and all combinations of one or more of the associated listed items.

Figure 3:
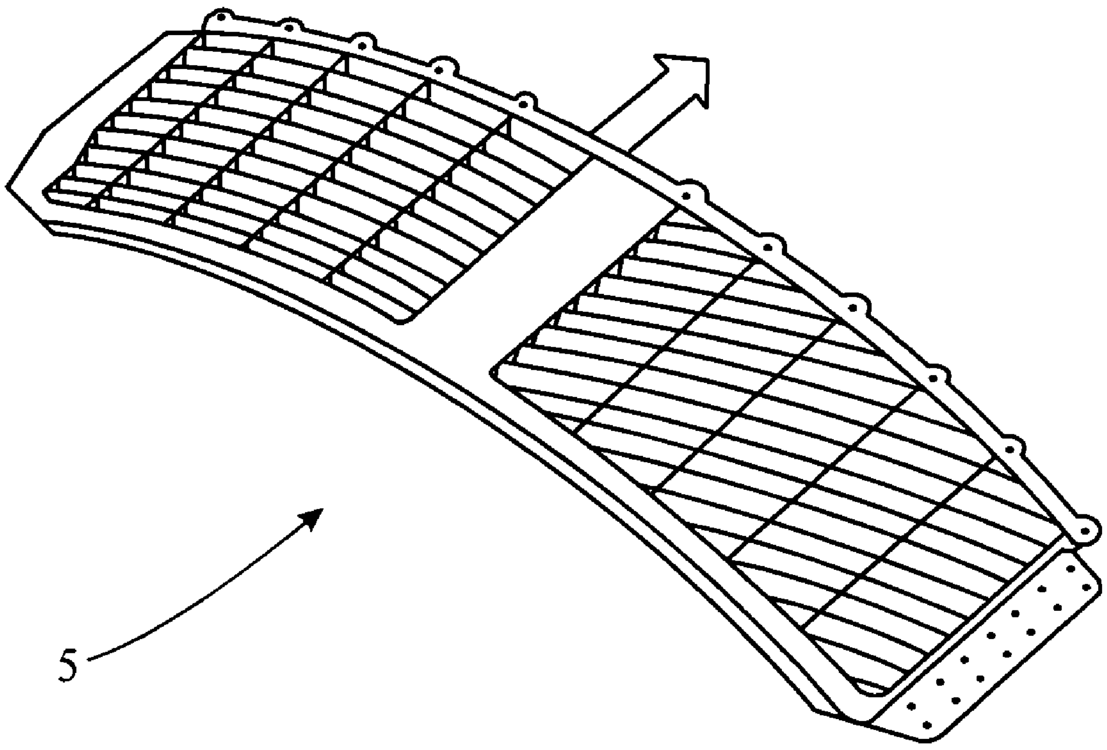
FIG. 3 is a perspective view of a series of typical cascaded vanes of the natural blockage thrust reverser of FIG. 1.
Figure 3A:
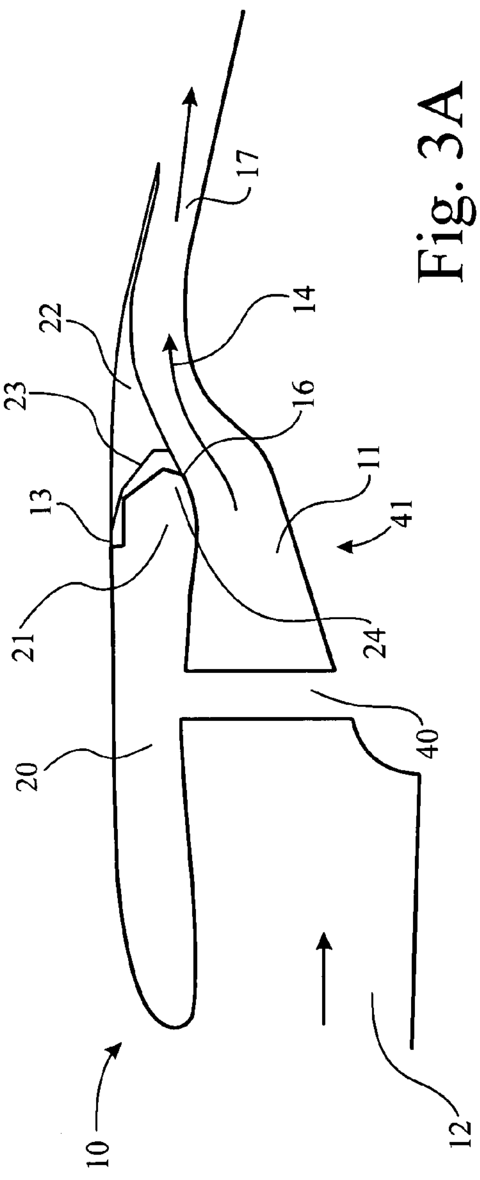
FIG. 3A is a schematic side view of an aircraft structure according to the invention in a stowed configuration.
Figure 3B:
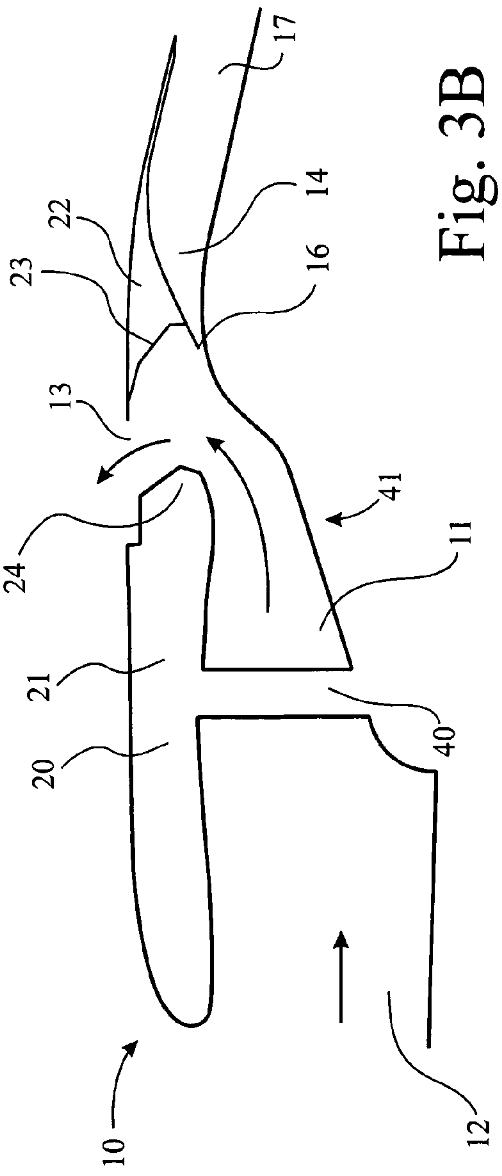
FIG. 3B is a schematic side view of the aircraft structure of FIG. 3A in a deployed configuration.
Figure 4:
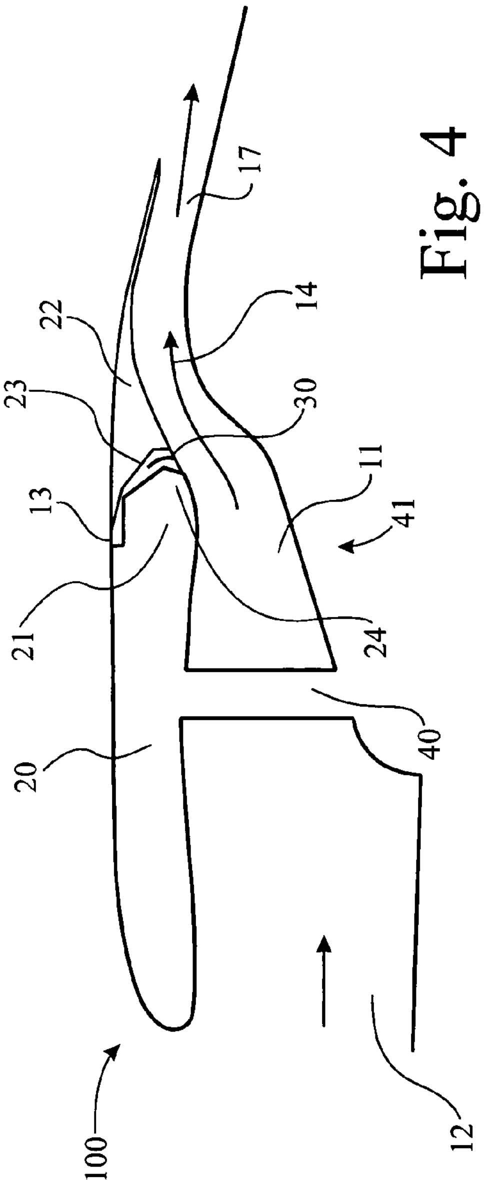
FIG. 4 is a schematic side view of another aircraft structure according to the invention in a stowed configuration.
Figure 5:
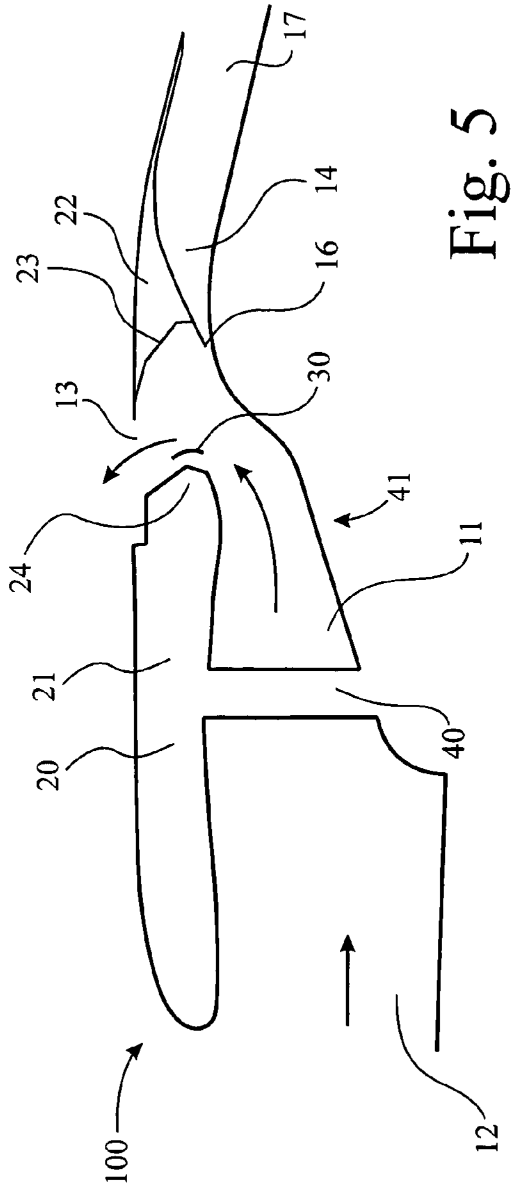
FIG. 5 is a schematic side view of the aircraft structure of FIG. 4 in a deployed configuration.
Figure 8:
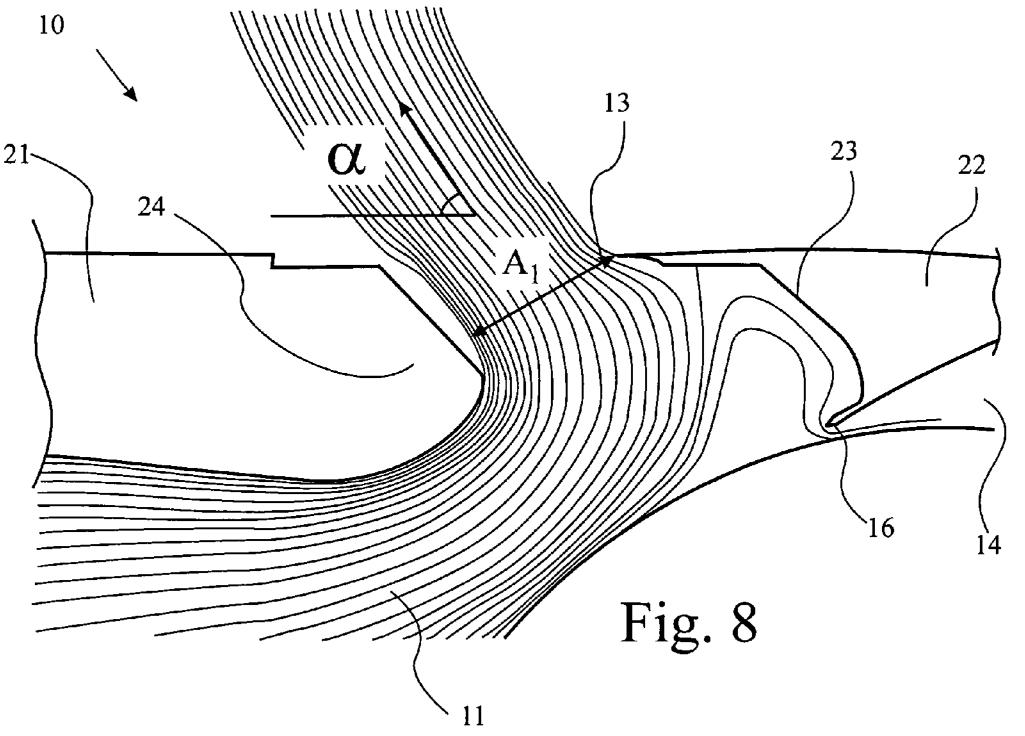
FIG. 8 is a schematic side view of the aircraft structure of FIG. 3B, in use.

Referring to FIGS. 3A, 3B and 8, there is illustrated an aircraft structure according to the invention. In this case the aircraft structure comprises an aircraft engine nacelle 10.

The aircraft engine nacelle 10 is arranged to form a natural blockage thrust reverser. In particular the aircraft engine nacelle 10 comprises a stationary diverter fairing 21, and a translating cowl 22 located downstream of the diverter fairing 21. The translating cowl 22 is movable relative to the diverter fairing 21 between a stowed configuration (FIG. 3A) and a deployed configuration (FIG. 3B).

The aircraft engine nacelle 10 comprises a duct, in this case a fan duct 11. The fan duct 11 has an inlet 12 for fluid flow into the fan duct 11, and two outlets 13, 14 for fluid flow out of the fan duct 11. The first outlet 13 facilitates fluid flow out of the fan duct 11 when the translating cowl 22 is in the deployed configuration (FIG. 3B). The second outlet 14, which is located downstream of the first outlet 13, facilitates fluid flow out of the fan duct 11 when the translating cowl 22 is in the stowed configuration (FIG. 3A).

The fluid flow enters the aircraft engine nacelle 10 by way of the inlet 12, passes through the engine fan 40 and into the fan duct 11. Part of the fluid flow in the fan duct 11 is drawn into the core 41 for combustion. The remaining fluid flow continues along the fan duct 11 and exits the aircraft engine nacelle 10 by two different means. When the translating cowl 22 is in the stowed configuration (FIG. 3A), the second outlet 14 facilitates the fluid flow out of the fan duct 11. When the translating cowl is in the deployed configuration (FIG. 3B), the first outlet 13 facilitates the fluid flow out of the fan duct 11.

In the stowed configuration, the translating cowl 22 acts as a closure member to block the first outlet 13 and thereby prevent fluid flow out of the fan duct 11 through the first outlet 13, while facilitating fluid flow out of the fan duct 11 through the second outlet 14, as illustrated in FIG. 3A. In the deployed configuration, the translating cowl 22 blocks the second outlet 14 and thereby prevents fluid flow out of the fan duct 11 through the second outlet 14, while facilitating fluid flow out of the fan duct 11 through the first outlet 13, as illustrated in FIG. 3B.

As illustrated in FIG. 3A, in the stowed configuration the fan duct 11 is configured to guide fluid flow out of the fan duct 11 through the second outlet 14 in substantially the same direction as the fluid flow into the fan duct 11 through the inlet 12. Thus, in the stowed configuration, the aircraft engine nacelle 10 operates in a forward thrust mode.

In contrast, in the deployed configuration the fan duct 11 is configured to guide fluid flow out of the fan duct 11 through the first outlet 13 in substantially the reverse direction to the fluid flow into the fan duct 11 through the inlet 12, as illustrated in FIG. 3B. In particular, the direction of fluid flow out of the fan duct 11 through the first outlet 13 subtends an angle of greater than 90° with the direction of fluid flow into the fan duct 11 through the inlet 12. Thus in the deployed configuration, the aircraft engine nacelle 10 operates in a reverse thrust mode to achieve reverse thrust.

In the deployed configuration, the first outlet 13 is substantially open, the flow cross-sectional area at the first outlet 13 being substantially equal to the flow cross-sectional area at the fan duct nozzle 17.

The translating cowl 22 has a concave forwardly facing surface 23 to assist in guiding the fluid flow towards the first outlet 13 in the deployed configuration (FIG. 3B). In the stowed configuration, the concave surface 23 of the translating cowl 22 co-operates with a rearwardly protruding convex nose 24 of the diverter fairing 21 (FIG. 3A). In this manner a clash between the concave surface 23 of the translating cowl 22 and the convex nose 24 is prevented. The translating cowl 22 has an arrow-head seal 16 which ensures a smooth profile in the fan duct 11 when the translating cowl 22 is stowed (FIGS. 3A, 3B). It will be understood that the surface 23 need not be concave but rather could be planer or some other shape.

The concave nature of the translating cowl 22 assists in guiding the fluid flow out of the fan duct 11 through the first outlet 13 in the reverse direction to achieve the desired reverse thrust in the deployed configuration (FIG. 3B). Similarly the convex nature of the nose 24 assists in guiding the fluid flow out of the fan duct 11 through the first outlet 13 in the reverse direction to achieve the desired reverse thrust in the deployed configuration (FIG. 3B).

As described above, with reference to FIGS. 3A and 3B, in the deployed configuration the fluid flow turns through more than 90° to achieve reverse thrust, for example turned through an angle of approximately 135°. The greater this turning angle is, then the greater is the reverse thrust achieved. However the turning angle must be controlled to prevent the fluid flow being re-ingested into the inlet 12, and re-entering the fan duct 11 once more. The fluid flow when it passes through the engine fan 40 increases in temperature as the air is compressed. Thus air which is continually re-ingested, continues to increase in temperature, and this is to be avoided.

Three components that govern reverse thrust performance are the mass flow rate of the reverse flow, the reverse turning angle of the reverse flow, and reverse flow velocity.

In some cases, due to the adverse pressure gradient around the diverter fairing nose 24, the fluid flow may separate, as illustrated in FIG. 8. The separated fluid flow may result in the effective flow cross-sectional area $A_1$ at the first outlet 13 being reduced, and thus the mass flow rate being reduced. In addition the reverse turning angle of the fluid flow may be reduced. In this way, the overall reverse thrust performance may be less effective.

Referring to FIGS. 4 to 7 and 9, there is illustrated another aircraft structure according to the invention, which is similar to the aircraft structure described previously with reference to FIGS. 3A, 3B and 8, and similar elements in FIGS. 4 to 7 and 9 are assigned the same reference numerals.

Figure 7:
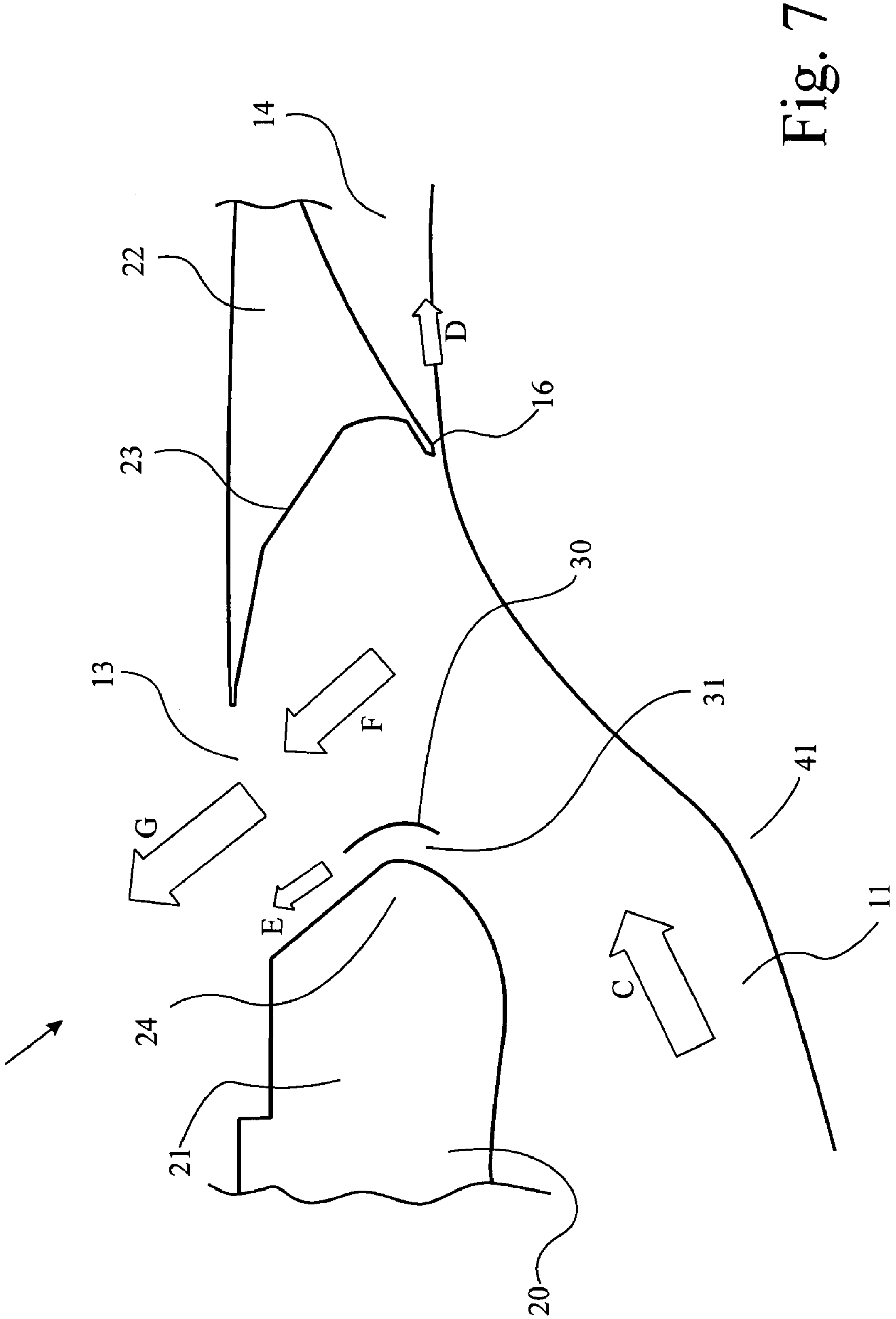
FIG. 7 is an enlarged, schematic side view of a part of the aircraft structure of FIG. 6, in use.

In this case to minimise the possibility of flow separation in the fan duct 11, in particular at the diverter fairing nose 24, the aircraft engine nacelle 100 comprises means to control fluid flow through the fan duct 1. In this case the flow control means is provided in the form of a slat 30, as illustrated in FIG. 7. The slat 30 is located in the region of the convex diverter fairing nose 24 to form a slot 31 between the slat 30 and the diverter fairing nose 24 (FIG. 7). The slat 30 is similar to a classical 'turning vane'.

Figure 9:
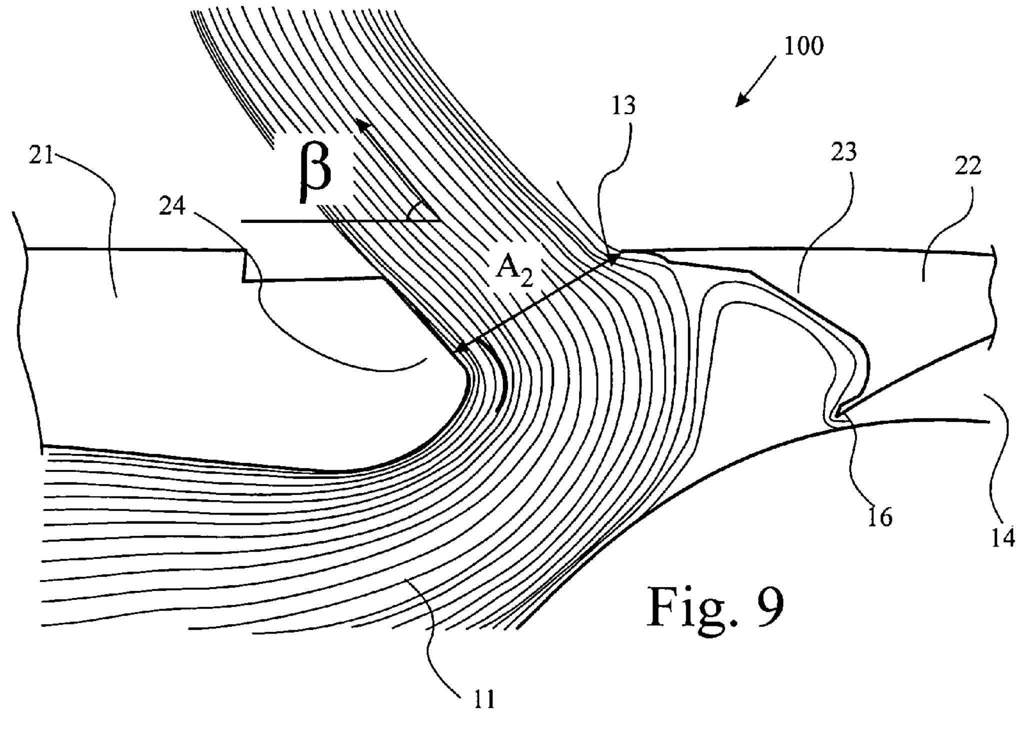
FIG. 9 is a schematic side view of the aircraft structure of FIG. 7, in use.

The fluid flow in the slot 31 between the diverter fairing nose 24 and the slat 30 is akin to pipe flow, and the pressure gradient is such that the fluid flow remains attached to the diverter fairing nose 24, as illustrated in FIG. 9. The provision of the slat 30 with the fluid flow through the slot 31 therefore provide the required degree of fluid flow control to reduce or eliminate the possibility of fluid flow separation in the fan duct 11, in particular at the diverter fairing nose 24.

The flow cross-sectional area of the slot 31 is, in this case, small relative to the overall flow cross-sectional area of the fan duct 11. In addition, the slot 31 converges towards the first outlet 13, thus accelerating the fluid flow. An accelerated flow has a negative pressure gradient which helps to prevent boundary layer separation.

Figure 6:
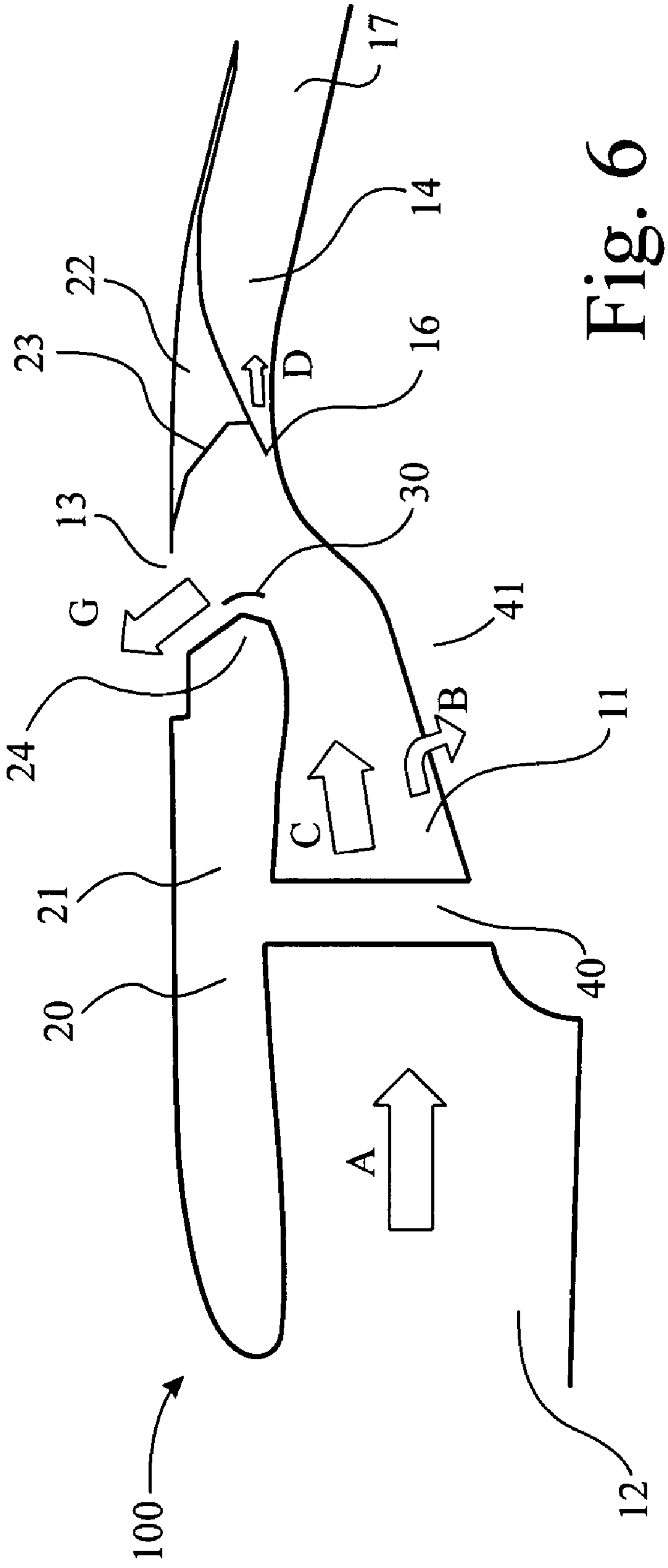
FIG. 6 is a schematic side view of the aircraft structure of FIG. 5, in use.
Figure 10:
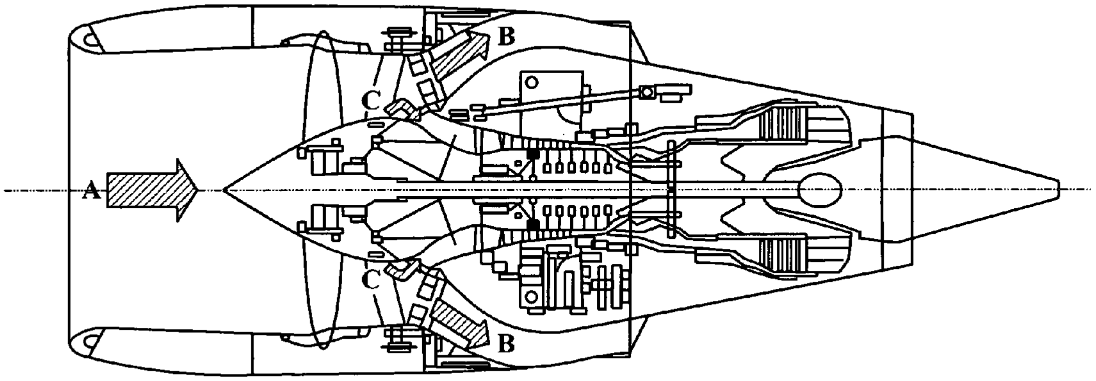
FIG. 10 is a side view of an aircraft structure comprising the natural blockage thrust reverser of FIG. 1 in the stowed configuration.

In use, and referring to FIGS. 6, 7 and 10, the fluid flow A is drawn into the inlet 12, and is compressed as it passes through the fan 40 and into the fan duct 11. Within the fan duct 11, part of the fluid flow B is drawn into the core for combustion, whilst the remaining fluid flow C passes through the fan duct 11. The remaining fluid flow C divides into three components: the leakage flow D past the translating cowl 22 through the second outlet 14; the flow E in the slot 31 between the diverter fairing 21 and the slat 30; and the flow F between the slat 30 and the translating cowl 22. These later two components of the flow E, F come together again to form the total reverse flow G.

The slot 31 results in high velocity fluid flow E along the diverter fairing surface, thus creating a low pressure which draws the main reverse flow F towards the slat 30. This keeps the main reverse flow F attached to the slat outer surface. Thus the reverse turning angle of the reverse flow is improved, as can be seen by comparing angle $\beta$ of FIG. 9 with angle $\alpha$ of FIG. 8.

The slat 30 also results in the area available for fluid flow out of the fan duct 11 to be more effectively used which results in an increase in mass flow rate, as can be seen by comparing area $A_1$ of FIG. 8 with area $A_2$ of FIG. 9.

The slat 30 may be located further from the diverter fairing nose 24 than in the aircraft structure described previously with reference to FIGS. 4 to 7 and 9, to thereby form a slot 31 having a larger flow cross-sectional area. In particular, it has been found that with the slat 30 located a larger distance from the diverter fairing nose 24, an effective reverse thrust performance may still be achieved.

It will be appreciated that one or more flow control means may be provided at any suitable location in the fan duct 11 to minimise the possibility of flow separation, for example in the region of the first outlet 13 to minimise the possibility of flow separation in the region of the first outlet 13.

It will also be appreciated that other suitable flow control means may be employed in addition to or instead of the slat 30. Suitable alternative flow control means include vortex generators, porous surface with suction, suction slot to remove boundary layer, roughened or dimpled surface, boundary layer trip, backward facing step, converging flow channel, optimised diverter fairing shape.

It will further be appreciated that the aircraft engine nacelle 10 described previously with reference to FIGS. 3A, 3B and 8, and/or the aircraft engine nacelle 100 described previously with reference to FIGS. 4 to 7 and 9 may comprise means to direct the fluid flow in a particular desired direction as the fluid flows out of the fan duct 11 through the first outlet 13 and/or the second outlet 14. The flow directing means may be in the form of one or more flow skewing devices. These flow skewing devices may be mounted to the translating cowl 22 and/or to the diverter fairing 21.

The flow skewing devices enable fluid flow to be turned in a suitable direction to avoid fluid flow impingement on critical aircraft surfaces which could result in loss of aircraft stability and/or control, and/or fluid flow impingement on the ground which could result in foreign object damage, and/or engine re-ingestion which could result in loss of performance.

Although the device for reversing thrust according to the invention has been described with reference to an aircraft engine nacelle, it will be appreciated that the thrust reverser may also be employed with other aircraft structures.

The invention is not limited to the embodiments hereinbefore described, with reference to the accompanying FIGS. 3A to 9, which may be varied in construction and detail.

Many variations and modifications can be made to the embodiments described herein without substantially departing from the principles of the present invention. All such variations and modifications are intended to be included herein within the scope of the present invention, as set forth in the following claims.

That which is claimed:

1. An aircraft engine fan duct structure, comprising:

a duct comprising an inlet for fluid flow into the duct in a thrust direction, a first outlet for fluid flow out of the duct, the duct being configured to guide fluid flow out of the duct through the first outlet in an at least partially reversed direction relative to fluid flow into the duct to reverse thrust, and a closure member in the form of a translating cowl member configured to selectively prevent fluid flow out off the duct through the first outlet, wherein the closure member is moveable relative to the duct between a deployed position for fluid flow out of the duct through the first outlet and a stowed position for preventing fluid flow out of the duct through the first outlet, wherein the reversed direction of fluid flow through the first outlet is greater than 90 degrees relative to a direction of fluid flow into the duct; and a slot adjacent a sidewall of the duct, the slot configured to control fluid flow through the duct to minimize flow separation, wherein the slot converges towards the first outlet to accelerate fluid flow.

2. A structure as claimed in claim 1 wherein the closure member has an at least partially concave surface to guide fluid flow.

3. A structure as claimed in claim 1 wherein at least part of a wall of the duct has a convex surface to guide fluid flow.

4. A structure as claimed in claim 1 wherein the closure member is mateable with a co-operating part of a wall of the duct.

5. A structure as claimed in claim 1 wherein the duct comprises a second outlet for fluid flow out of the duct through the second outlet when the closure member is in the stowed configuration.

6. A structure as claimed in claim 5 wherein the closure member at least partially restricts fluid flow out of the duct through the second outlet when the closure member is in the deployed configuration.

7. A structure as claimed in claim 5 wherein the second outlet is located substantially downstream of the first outlet.

8. A structure as claimed in claim 5 wherein the duct is configured for fluid flow out of the duct through the second outlet in at least partially the direction of fluid flow into the duct.

9. A structure as claimed in claim 1 wherein the direction of fluid flow out of the duct through the first outlet subtends an angle of approximately 135° with the direction of fluid flow into the duct.

10. A structure as claimed in claim 1 wherein the duct comprises a natural blockage thrust reverser.

11. A structure as claimed in claim 1 wherein the duct sidewall is provided by a surface of a diverter fairing.

12. A structure as claimed in claim 1 wherein the flow cross-sectional area of the slot is small relative to the overall flow cross-sectional area of the duct.

13. A structure as claimed in claim 1 wherein the slot is formed between a slat and a sidewall of the duct.

14. A structure as claimed in any of claim 1 wherein the slot is located in a region of a convex portion of a sidewall of the duct.

15. A structure as claimed in claim 1 wherein the slot is located in a region of a downstream end of a diverter fairing.

16. A structure as claimed in claim 1 wherein the slot is located in a region of the first outlet.

17. A structure as claimed in claim 1 further comprising:

means to direct fluid flow as fluid flows out of the duct through the first outlet.

18. A structure as claimed in claim 17 wherein the means to direct fluid flow is mounted to the closure member.

19. A structure as claimed in claim 17 wherein the means to direct fluid flow is mounted to a wall of the duct.

20. A structure as claimed in claim 17 wherein the flow directing means comprises at least one flow skewing device.

21. A structure as claimed in claim 1 wherein the aircraft structure comprises an aircraft engine nacelle.

* * * * *